United States Patent [19]
Kogame

[11] Patent Number: 5,582,086
[45] Date of Patent: Dec. 10, 1996

[54] PICKUP APPARATUS FOR PICKING UP A CUT SHEET FROM A WEAK SHEET SUCH AS A CERAMIC GREEN SHEET

[75] Inventor: Toshihiko Kogame, Kyoto-fu, Japan

[73] Assignee: Murata Manufacturing Co., Ltd., Japan

[21] Appl. No.: 320,446

[22] Filed: Oct. 11, 1994

Related U.S. Application Data

[62] Division of Ser. No. 77,944, Jun. 15, 1993, Pat. No. 5,382,404, which is a continuation of Ser. No. 347,498, May 4, 1989, abandoned.

[51] Int. Cl.⁶ .............................. B26D 7/18; B65H 29/24
[52] U.S. Cl. .............................. 83/152; 271/90; 264/139; 264/153
[58] Field of Search .................... 83/100, 152, 451; 271/90, 107; 264/139, 153; 156/257, 268, 269, 270

[56] References Cited

U.S. PATENT DOCUMENTS 2,416,173   2/1947   Halstead ................................. 83/152
4,185,814   1/1980   Buchmann et al. ................... 271/108

FOREIGN PATENT DOCUMENTS 63-102216   5/1988   Japan.

*Primary Examiner*—Kenneth E. Peterson
*Assistant Examiner*—Raymond D. Woods
*Attorney, Agent, or Firm*—Ostrolenk, Faber, Gerb & Soffen, LLP

[57] ABSTRACT

A ceramic green sheet for a laminated ceramic capacitor is formed on an upper surface of a carrier film and carried onto a surface plate while maintaining adhesion between the carrier film and the ceramic green sheet. Thereafter a cutting line having a closed outline is defined in the ceramic green sheet and a sheet cut enclosed by the cutting line is taken out by a pickup apparatus having a punching edge in its periphery and provided with a suction head in a portion enclosed by the punching edge.

23 Claims, 3 Drawing Sheets

PICKUP APPARATUS FOR PICKING UP A CUT SHEET FROM A WEAK SHEET SUCH AS A CERAMIC GREEN SHEET

This is a division of application Ser. No. 08/077,944, filed Jun. 15, 1993 now U.S. Pat. No. 5,382,404, which is a continuation of application Ser. No. 07/347,498, filed May 4, 1989, now abandoned.

BACKGROUND OF THE INVENTION

1. Field of the Invention

The present invention relates to a method of cutting out a sheet cut having constant dimensions from a weak sheet, and more particularly, it relates to a method of cutting out a sheet cut of a ceramic green sheet which is employed for a laminated ceramic capacitor, for example.

2. Description of the Background Art

In general, a laminated ceramic capacitor comprises a plurality of stacked ceramic sheets, a plurality of internal electrodes which are opposite to each other through the respective ceramic sheets and a pair of external electrodes provided on a pair of opposite end surfaces of the laminate formed by the plurality of ceramic sheets. The plurality of internal electrodes are electrically connected to either of the external electrodes in an alternate manner.

A conventional laminated ceramic capacitor has been generally manufactured in the following manner: A ceramic material in the form of slurry is applied onto a carrier film (base film) of polyester, for example, by a coating method such as a doctor blade method in uniform thickness. Then the ceramic material provided on the carrier film is dried. Thus, a ceramic green sheet is formed on the carrier film. Then, an internal electrode is printed on the surface of the ceramic green sheet by screen printing. Then the internal electrode, the carrier film and the ceramic green sheet are passed through a drying furnace to be dried. Thereafter the ceramic green sheet 3 is separated from the carrier film 1 by a suction roller 2, as shown in FIG. 4. The separated ceramic green sheet 3 is placed on an endless belt 4, which is partially shown in FIG. 4, and carried along arrow 5, to be positioned on a surface plate 6. The belt 4 is formed by a thin plate of a metal such as nickel, and provided with a large number of pores 7, as shown in FIG. 5. The surface plate 6 is provided with a plurality of suction holes 8. Negative pressure is applied to the suction holes 8 to such the ceramic green sheet 3 through the pores 7, thereby to locate the ceramic green sheet 3 on the surface plate 6.

As shown in FIG. 4, a vertically movable pickup apparatus 10 is positioned above the ceramic green sheet 3. The pickup apparatus 10 has a punching edge 11 in its periphery and is provided with a suction head 12 in a portion enclosed by the punching edge 11. The suction head 12 is provided with a plurality of suction holes 13.

When the pickup apparatus 10 is downwardly moved as shown in FIG. 5, the punching edge 11 defines a cutting line having a closed outline in the ceramic green sheet 3. Then the pickup apparatus 10 is upwardly moved so that a sheet cut 3a, which is in contact with the lower surface of the suction head 12 and enclosed by the aforementioned cutting line, is taken out from the remaining part of the ceramic green sheet 3.

Thereafter a prescribed number of such sheet cuts 3a are stacked and then pressurized. A laminate of the sheet cuts 3a thus obtained is cut in dimensions for providing an individual capacitor, if necessary. Then this laminate is fired.

Silver paste members are applied to opposite end surfaces of the fired laminate and then baked, thereby to form a pair of external electrodes. A desired ceramic laminated capacitor is obtained in such a manner.

The internal electrode may be alternatively printed after the sheet cut 3a is obtained as shown in FIG. 4.

In the aforementioned method, the ceramic green sheet 3 is necessarily independently carried toward the belt 4 after the same is separated from the carrier film 1. That is, the ceramic green sheet 3 is brought into an independent state on upstream and downstream sides of the suction roller 2 in the example shown in FIG. 4. Thus, the ceramic green sheet 3 may be deformed, broken or wrinkled if the same is thin, i.e., mechanically weak. Thereafter, it is difficult to obtain the sheet cut 3a in high dimensional accuracy, and hence the production yield of laminated ceramic capacitors is reduced as the result.

Further, high accuracy is required for straightness of the punching edge 11, which is directly brought into contact with the surface of the belt 4 of nickel or the like in order to cut the ceramic green sheet 3. If the punching edge 11 is inferior in straightness, it is not possible to completely cut the ceramic green sheet 3. Further, the life of the punching edge 11 is reduced since the same is brought into contact with the hard belt 4 for cutting the ceramic green sheet 3. If the punching edge 11 is chipped, metal scraps may be mixed into the ceramic green sheet 3.

SUMMARY OF THE INVENTION

Accordingly, an object of the present invention is to provide a method of cutting a weak sheet such as a ceramic green sheet, which can reliably cut the sheet with a punching edge.

Another object of the present invention is to provide a method of cutting a weak sheet such as a ceramic green sheet, which can elongate the life of a punching edge.

According to the present invention, a weak sheet is first formed on a carrier film. Then the sheet is carried onto a surface plate with the carrier film. The sheet is located on the surface plate through the carrier film in an upwardly directed state. A punching edge is applied to the located sheet to at least reach the surface of the carrier film, thereby to define a cutting line having a closed outline in the sheet. A sheet cut enclosed by the cutting line is taken out from the remaining part of the sheet by suction.

In a preferred embodiment of the present invention, a ceramic green sheet is applied as a weak sheet, and the step of forming the sheet on the carrier film includes a step of applying ceramic slurry onto the carrier film in uniform thickness. The carrier film preferably has higher shearing stress as compared with the sheet and hardness causing no breakage of the punching edge. Preferably the carrier film is formed of polyester. The carrier film may be coated with a mold release agent on a surface provided with the sheet, so that the sheet cut can be easily separated from the carrier film.

The steps of defining the cutting line and taking out the sheet cut are preferably carried out through pickup means which has a punching edge in its periphery and is provided with a suction head in a portion enclosed by the punching edge. Such a suction head has a surface which is brought into contact with the sheet cut, and a plurality of suction holes are distributed in such a surface. Particularly in the case of a thin sheet, suction force acting on the surface of the suction head which is brought into contact with the sheet cut is preferably stronger in a portion around its outer periphery than in a central portion. To this end, those of the suction holes distributed around the outer periphery of the surface which is in contact with the sheet cut are larger than those distributed around the central portion.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
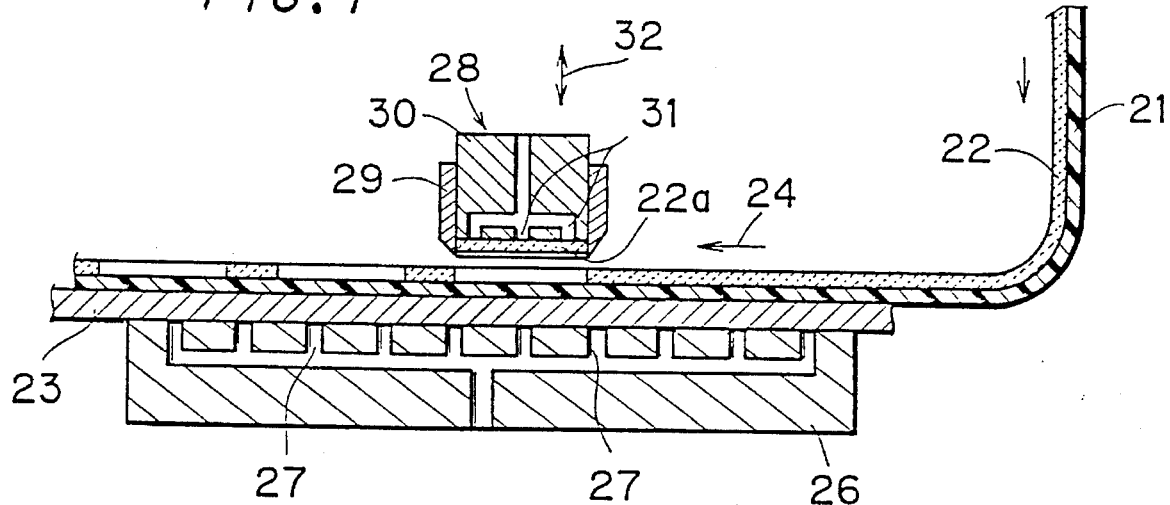
FIG. 1 is a sectional view showing an apparatus for cutting out a sheet cut, for illustrating an embodiment of the present invention.

Referring to FIG. 1, a ceramic green sheet 22 is formed on a carrier film 21 of polyester, for example, by applying ceramic slurry in uniform thickness. A method of forming the ceramic green sheet 22 on the carrier film 21 is similar to that in the aforementioned conventional case. Adhesion between the carrier film 21 and the ceramic green sheet 22 is preferably suppressed since the same must be separated from each other in a later step. To this end, the carrier film 21 may be previously coated with a mold release agent on a surface provided with the ceramic green sheet 22. An internal electrode (not shown) is formed on the surface of the ceramic green sheet 22 by screen printing or the like. The internal electrode may be alternatively formed after a sheet cut is obtained as described hereinafter.

Figure 2:
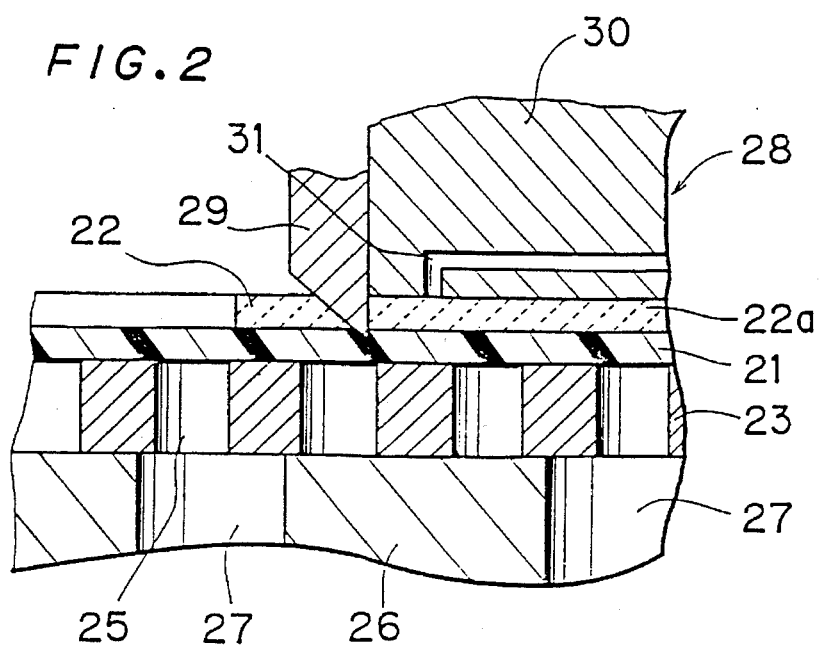
FIG. 2 is an enlarged sectional view showing structure around a punching edge in the apparatus shown in FIG. 1.

The carrier film 21 and the ceramic green sheet 22 are placed on an endless belt 23, which is partially shown in FIG. 1, and carried along arrow 24. Similarly to the aforementioned belt 4, this belt 23 is formed by a thin plate of a metal such as nickel and is provided with a large number of pores 25, as shown in FIG. 2. Other types of means for carrying the carrier film 21 and the ceramic green sheet 22 may be used in place of the belt 23. Further, such carrying means may be omitted.

The belt 23 is moved along the upper surface of a surface plate 26. The surface plate 26 is provided with a plurality of suction holes 27. Negative pressure is applied to the suction holes 27 from a vacuum source (not shown) and then supplied to the carrier film 21 through the pores 25, thereby to locate the carrier film 21 on the surface plate 26. While negative pressure is applied to the suction holes 27, the belt 23 carries the ceramic green sheet 22 and the carrier film 21 by a prescribed distance along the arrow 24.

A pickup apparatus 28 is positioned above the surface plate 26. The pickup apparatus 28 has a punching edge 29 in its periphery and is provided with a suction head 30 in a portion enclosed by the punching edge 29. A plurality of suction holes 31 are formed in the lower surface of the suction head 30. Suction force applied to the suction holes 31 is stronger than that applied to the aforementioned suction holes 27 of the surface plate 26.

The pickup apparatus 28 is vertically movable, as shown by arrow 32. The punching edge 29 is also movable along the arrow 32 with respect to the suction head 30.

The pickup apparatus 28 is downwardly moved in order to cut out a sheet cut 22a having constant dimensions from the ceramic green sheet 22 located in the aforementioned manner. At this time, the lower end of the punching edge 29 is projected from the lower surface of the suction head 30, and the length of such projection is selected to slightly exceed the thickness of the ceramic green sheet 22, as shown in FIG. 2. Thus the punching edge 29 completely cuts the ceramic green sheet 22, while incompletely cutting the carrier film 21. To this end, the carrier film 21 preferably has higher shearing stress as compared with the ceramic green sheet 22 and hardness causing no breakage of the punching edge 29.

When the punching edge 29 cuts the ceramic green sheet 22 as shown in FIG. 2, a cutting line having a closed outline is defined in the ceramic green sheet 22. In this state, suction force is applied to the suction holes 31 provided in the suction head 30 and the pickup apparatus 28 is upwardly moved so that a sheet cut 22a enclosed by the cutting line is taken out from the remaining part of the ceramic green sheet 22. FIG. 1 shows this state. Adhesion between the carrier film 21 and the ceramic green sheet 22 is so selected that the sheet cut 22a can be raised up following the aforementioned upward movement of the pickup apparatus 28.

A plurality of sheet cuts 22a taken out by the pickup apparatus 28 as shown in FIG. 1 are sequentially stacked similarly to the aforementioned prior art. In a step of such stacking, preferably the lower end of the punching edge 29 is not projected from the lower surface of the suction head 30. A desired laminated ceramic capacitor is obtained through steps similar to those in the aforementioned prior art.

According to the present invention, the ceramic green sheet 22 is continuously adhered to the carrier film 21 until the cutting line having a closed outline is defined by the punching edge 29. Therefore, the ceramic green sheet 22 can be prevented from deformation, breakage and wrinkling even if the same is thin. Thus, cutting accuracy can be so improved as to improve the production yield of laminated ceramic capacitors as the result.

The punching edge 29 is applied to at least reach the surface of the carrier film 21, whereby the ceramic green sheet 22 can be completely cut even if the punching edge 29 has relatively low straightness. Further, the forward end of the punching edge 29 is not brought into contact with the metal belt 23 but with the carrier film 21 so that substantially no damage is caused in the punching edge 29, whereby its life can be elongated. In addition, inconvenience caused by chipping of the punching edge 29 can be also avoided.

Negative pressure which is supplied through the suction holes 27 provided in the surface plate 26 and the pores 25 provided in the belt 23 is directly applied to the carrier film 21. Thus, such negative pressure will cause no deformation of the ceramic green sheet 22 to be cut, whereby the ceramic green sheet 22 can be cut in a correct position also in this sense.

An extremely thin ceramic green sheet, which is not more than 30 μm in thickness, for example, may be also employable in the present invention. Such a thin ceramic green sheet is easily wrinkled when the sheet cut is taken out from the remaining part of the ceramic green sheet by suction. According to a suction head 30a shown in FIG. 3, it is possible to take out an extremely thin sheet cut by suction substantially with no wrinkling.

Figure 3:
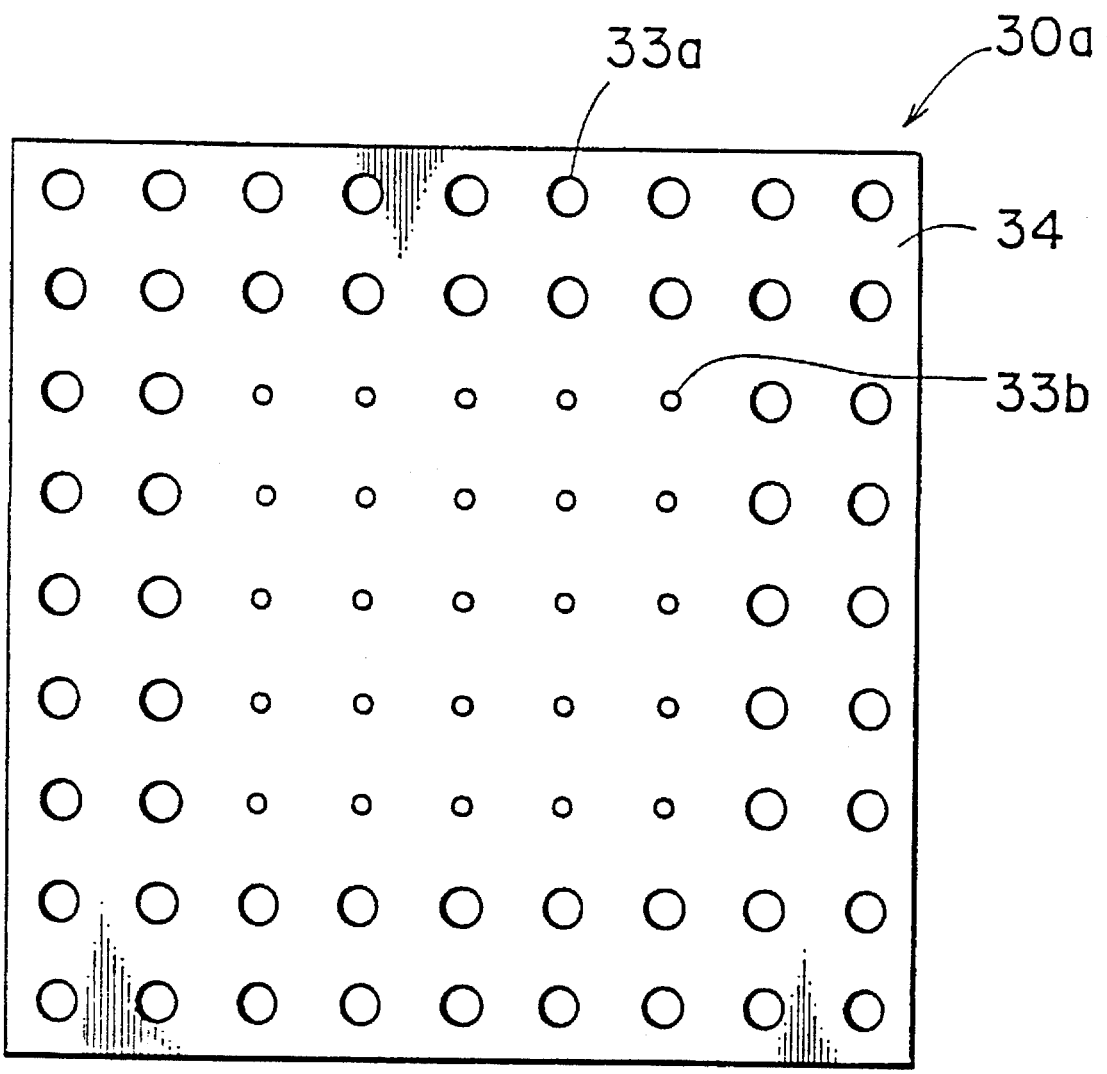
FIG. 3 is a bottom view showing a preferable state of distribution of suction holes formed in a suction head.
Figure 4:
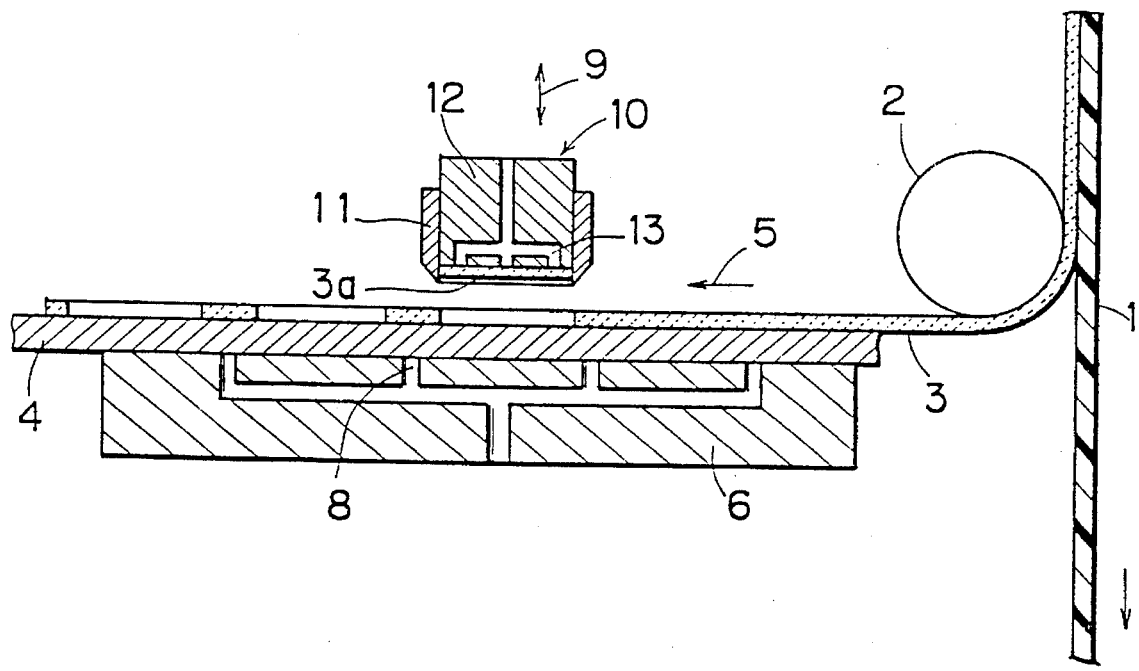
FIG. 4 is a sectional view corresponding to FIG. 1, which shows a conventional apparatus for cutting out a sheet cut.
Figure 5:
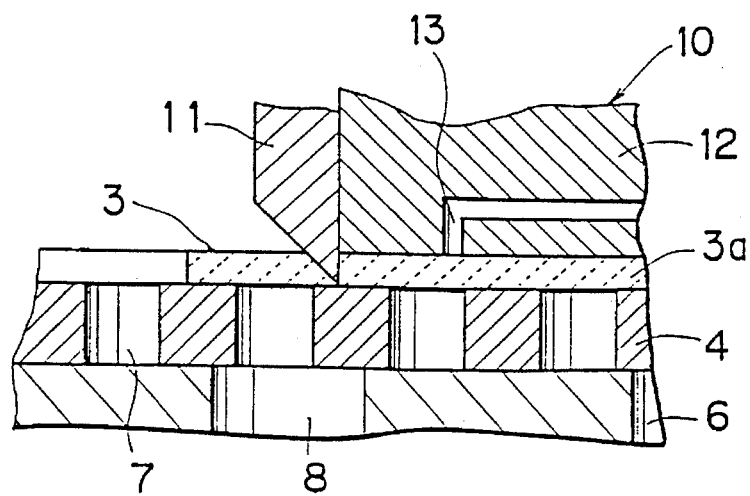
FIG. 5 is an enlarged sectional view corresponding to FIG. 2, which shows a part of the apparatus shown in FIG. 4.

Referring to FIG. 3, a plurality of suction holes 33a and 33b are distributed in a surface 34 of the suction head 30a which is in contact with a sheet cut. Within the suction holes 33a and 33b, those distributed around the outer periphery of the surface 34 are 0.8 mm in diameter, for example, and those distributed around the central portion are 0.3 mm in diameter, for example. In other words, the suction holes 33a distributed around the outer periphery of the surface 34 are larger in diameter than the suction holes 33b distributed around the central portion. Thus, suction force acting on the surface 34 is stronger in a portion around the outer periphery than in the central portion.

The carrier film employed in the present invention is not restricted to a polyester film but another type of resin film is also employable. Preferable properties of the carrier film are higher shearing stress as compared with the ceramic green sheet, hardness causing no breakage of the punching edge, small deformability against tensile force, small deformability against heat which is applied in the step of drying the ceramic green sheet, the internal electrode, and the like.

While the above embodiment has been described with reference to a ceramic green sheet, the present invention is also applicable to another type of weak sheet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pickup apparatus for picking up a cut sheet defined by a cutting line in a weak sheet, said pickup apparatus comprising:

a suction head movable with respect to a major surface of said cut sheet and having a contact surface to be in contact with said cut sheet, said suction head having conduits for receiving a suction force and channelling the suction force to a plurality of suction holes distributed in a central portion and in a peripheral portion of said contact surface, at least one suction hole in said central portion having a first size and thereby applying a first suction force to said cut sheet, and each of said suction holes in said peripheral portion having a second size which is larger than said first size and thereby applying a second suction force to said cut sheet which is larger than said first suction force, whereby the suction head applies a stronger suction force in the peripheral portion than in the central portion.

2. A pickup apparatus in accordance with claim 1, further comprising a carrier film disposed adjacent said suction head so as to support said cut sheet as it is picked up by said suction head.

3. A pickup apparatus in accordance with claim 2, further comprising a cutting edge adjacent said suction head for forming said cutting line in said weak sheet so as to define said cut sheet; and a base surface plate adjacent said suction head and disposed for supporting said weak sheet and carrier film while said weak sheet is cut and said cut sheet is picked up;

said weak sheet and said carrier film having an elongated strip-like shape; and a conveyor for moving said elongated weak sheet and carrier film continuously past said base surface plate for permitting a plurality of said cut sheets to be cut out and removed from said weak sheet.

4. A pickup apparatus for picking up a cut sheet defined by a cutting line in a weak sheet, said pickup apparatus comprising:

a suction head movable with respect to a major surface of said cut sheet and having a contact surface to be in contact with said cut sheet, said suction head having conduits for receiving a suction force and channelling the suction force to a plurality of suction holes distributed in a central portion and in a peripheral portion of said surface to be in contact with said cut sheet, wherein said plurality of suction holes distributed in the peripheral portion of said contact surface are larger than the suction holes distributed in the central portion, whereby the suction holes in the peripheral portion of said contact surface apply a stronger suction force than in the central portion.

5. A pickup apparatus in accordance with claim 4, wherein said suction holes in said peripheral portion are 0.8 mm in diameter and said suction holes in said central portion are 0.3 mm in diameter.

6. In combination, the pickup apparatus of claim 5, in combination with said cut sheet, said cut sheet being an extremely thin ceramic green sheet which is no more than about 30 microns thick.

7. In combination, the pickup apparatus of claim 4, in combination with said cut sheet, said cut sheet being an extremely thin ceramic green sheet which is no more than about 30 microns thick.

8. In combination, a pickup apparatus for picking up a cut sheet defined by a cutting line in a weak sheet, said pickup apparatus comprising:

a suction head movable with respect to a major surface of said cut sheet and having a contact surface to be in contact with said cut sheet, said suction head having conduits for receiving a suction force and channelling the suction force to a plurality of suction holes distributed in a central portion and in a peripheral portion of said surface to be in contact with said cut sheet, the suction holes in the peripheral portion of said contact surface having a larger size and thereby applying a stronger suction force than the suction holes in the central portion, in combination with said cut sheet, said cut sheet being an extremely thin ceramic green sheet which is no more than about 30 microns thick.

9. An apparatus for producing a cut sheet having predetermined dimensions, comprising:

a carrier film with a weak sheet supported thereon;

a punching edge arranged for punching through said weak sheet to form a continuous cutting line in said weak sheet, thereby defining a cut sheet and a remaining part of said weak sheet;

a suction head arranged for applying suction to said cut sheet through suction holes and thereby removing the cut sheet from the carrier film and from the remaining part of said weak sheet by suction;

said suction head having suction hole of a first size applying a first suction force to a peripheral portion of said cut sheet, and having suction holes of a second size smaller than said first size applying a second suction force which is substantially weaker than said first suction force to a central portion of said cut sheet.

10. The apparatus of claim 9, further comprising a release layer interposed between the weak sheet and the carrier film.

11. The apparatus of claim 10, wherein said release layer comprises a mold release agent.

12. The apparatus of claim 9, wherein said weak sheet is an extremely thin ceramic green sheet no more than about 30 microns thick.

13. The apparatus of claim 12, wherein said suction head peels the cut sheet off the carrier film starting with the peripheral portion of the cut sheet.

14. The apparatus of claim 9, wherein said suction head peels the cut sheet off the carrier film starting with the peripheral portion of the cut sheet.

15. The apparatus of claim 9, wherein said punching edge is operable to punch through said weak sheet and said release layer and at least reach said carrier film and to incompletely cut said carrier film.

16. The apparatus of claim 9, wherein said punching edge is mounted to a peripheral portion of said suction head.

17. The apparatus of claim 9, wherein said suction holes are 0.8 mm in diameter in said peripheral portion and are 0.3 mm in diameter in said central portion.

18. The apparatus of claim 9, wherein said weak sheet is a ceramic green sheet and said carrier film is a film having higher shearing stress tolerance than said green sheet, said carrier film also having a degree of hardness which does not cause substantial breakage of said punching edge.

19. The apparatus of claim 9, further comprising a base plate and a conveyor for moving said weak sheet and carrier film onto said base plate.

20. The apparatus of claim 19, further comprising a suction device at said base plate for drawing said carrier film toward said base plate.

21. The apparatus of claim 20, wherein said conveyor includes a belt interposed between said suction device and said base plate, the belt having pores for permitting said carrier film to be drawn toward said base plate through said belt.

22. The apparatus of claim 19, wherein said conveyor is capable of carrying a plurality of said cut sheets to a corresponding plurality of positions on said base plate.

23. The apparatus of claim 19, wherein said weak sheet is directly accessible to ambient atmosphere and to said punching edge with no additional carrier film interposed over said weak sheet.

* * * * *